(12) United States Patent
Ohtaki et al.

(10) Patent No.: US 7,545,255 B2
(45) Date of Patent: Jun. 9, 2009

(54) ELECTRONIC KEY SYSTEM

(75) Inventors: Kiyokazu Ohtaki, Aichi (JP); Yoshiyuki Mizuno, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/462,475

(22) Filed: Jun. 16, 2003

(65) Prior Publication Data
US 2004/0021550 A1 Feb. 5, 2004

(30) Foreign Application Priority Data
Jun. 21, 2002 (JP) .............................. 2002-181935

(51) Int. Cl.
B60R 25/00 (2006.01)
G05B 19/00 (2006.01)
G06F 7/00 (2006.01)
G08B 29/00 (2006.01)
H04B 1/00 (2006.01)

(52) U.S. Cl. .................... 340/5.72; 340/5.23; 340/5.31; 340/5.65

(58) Field of Classification Search ................ 340/5.27, 340/5.64, 5.7, 5.31, 5.72, 357.07, 359, 507, 340/426, 5.52; 307/10.5, 9.1, 10.2; 70/408; 180/287
See application file for complete search history.

(56) References Cited

U.S. PATENT DOCUMENTS

| | | | |
|---|---|---|---|
| 4,754,255 A | 6/1988 | Sanders et al. | |
| 5,006,843 A * | 4/1991 | Hauer | 340/5.28 |
| 5,055,658 A * | 10/1991 | Cockburn | 235/382 |
| 5,111,185 A * | 5/1992 | Kozaki | 340/5.5 |
| 5,229,648 A * | 7/1993 | Sues et al. | 307/10.2 |
| 5,422,632 A | 6/1995 | Bucholtz et al. | |
| 5,479,156 A * | 12/1995 | Jones | 340/5.64 |
| 5,912,512 A * | 6/1999 | Hayashi et al. | 307/10.5 |
| 5,917,405 A * | 6/1999 | Joao | 340/426.17 |
| 6,160,488 A * | 12/2000 | Honda | 340/5.65 |
| 6,204,570 B1 | 3/2001 | Muller | |
| 6,271,745 B1 * | 8/2001 | Anzai et al. | 340/5.53 |
| 6,275,141 B1 * | 8/2001 | Walter | 340/5.64 |
| 6,386,007 B1 * | 5/2002 | Johnson et al. | 70/408 |

(Continued)

FOREIGN PATENT DOCUMENTS

EP    1 201 514 A1    5/2002

(Continued)

Primary Examiner—Brian A Zimmerman
Assistant Examiner—Nam V Nguyen
(74) Attorney, Agent, or Firm—Crompton, Seager & Tufte, LLC

(57) ABSTRACT

An electronic key system for a vehicle that prevents private information from being available to a third person. The electronic key system includes a terminal, electronic keys, and a device having comparing and control components. Each electronic key stores a distinct identification code and transmits the identification code to the vehicle. At least one of the identification codes is a restriction code for restricting the usage of the terminal. The comparing component is arranged in the vehicle and stores verification codes associated with the identification codes. The comparing component retrieves the identification code of one of the electronic keys and compares the retrieved identification code with an associated one of the verification codes. The control component restricts activation of the terminal when the retrieved identification code is the restriction code.

16 Claims, 2 Drawing Sheets

U.S. PATENT DOCUMENTS

| | | | |
|---|---|---|---|
| 6,501,369 B1 * | 12/2002 | Treharne | 307/10.5 |
| 6,525,433 B1 * | 2/2003 | Enoyoshi et al. | 307/10.5 |
| 6,696,927 B2 * | 2/2004 | Flick | 340/426.1 |
| 6,828,694 B2 * | 12/2004 | Flick | 307/10.5 |

FOREIGN PATENT DOCUMENTS

| | | |
|---|---|---|
| JP | 08-6885 A | 1/1996 |
| JP | 9-48323 A | 2/1997 |
| JP | 11-288296 A | 10/1999 |
| JP | 2000-345745 A | 12/2000 |
| JP | 2001-156887 A | 6/2001 |
| JP | 2002-57664 A | 2/2002 |
| JP | 2002-507165 A | 3/2002 |
| WO | WO 01/05167 A1 | 1/2001 |
| WO | WO 01/25572 A1 | 4/2001 |

* cited by examiner

ELECTRONIC KEY SYSTEM

BACKGROUND OF THE INVENTION

The present invention relates to an electronic key system that performs a predetermined operation in a vehicle through wireless communication between an electronic key and the vehicle.

In recent years, intelligent transport systems (ITS), which employ information technology, have been introduced to decrease traffic jams, exhaust gas, and automobile accidents. Examples of ITS are an advanced cruise-assist highway system (AHS), which maintains an appropriate distance between vehicles and issues a warning to the driver when necessary, and electronic toll collection (ETC), which enables payment of tolls for toll roads without stopping at toll booths. Other examples of ITS are a vehicle information and communication system (VICS), which uses a terminal installed in a vehicle such as a car navigation system terminal to provide the driver with traffic information, and an advanced safety vehicle (ASV), which automatically drives a vehicle.

To use the ITS, various types of terminals must be installed in a vehicle. Examples of such terminals are a car navigation system terminal, an ETC terminal, and a distress call system terminal. The car navigation system is a system for navigating the driver to a designated destination and includes functions such as illustration of route to destination and registration, viewing, editing, and customizing of private information.

An ETC terminal performs communication through an antenna provided in a toll booth of a toll road. If an accident occurs or a passenger suddenly becomes sick when an automobile is being driven, the distress call system terminal sends the information required for rescue crews to an appropriate facility, such as a rescue center. When activated, the ETC terminal and the distress call system terminal indicate their usage history.

Presently, when a car owner lends the key to a third person, the third person would be able to use a vehicle terminal. For example, the third person would be able to use the navigation system terminal, the ETC terminal, or the distress call system terminal. Thus, the third person may use the navigation system terminal without consent and register, view, edit, or customize the private information stored in the vehicle terminal. Further, the third person may use the ETC terminal or the distress call system terminal without consent and look into the usage history. Therefore, it is difficult for a car owner to lend the key to a third person without having to worry about how the key will be used when, for example, having someone park or repair the car.

SUMMARY OF THE INVENTION

One aspect of the present invention is an electronic key system for use in a vehicle. The key system includes a terminal installed in the vehicle to process predetermined information and a plurality of electronic keys, each storing an identification code and transmitting the identification code to the vehicle. At least one of the identification codes is a restriction code for restricting the usage of the terminal. A comparing means is arranged in the vehicle and stores a plurality of verification codes associated with the identification codes. The comparing means retrieves the identification code of one of the electronic keys and compares the retrieved identification code with an associated one of the verification codes. A control means restricts activation of the terminal when the retrieved identification code is the restriction code.

Another aspect of the present invention is an electronic key system for use in a vehicle. The key system includes a terminal installed in the vehicle to store information including private information and a plurality of electronic keys, each storing an identification code and transmitting the identification code to the vehicle. At least one of the identification codes is a restriction code for restricting the usage of the terminal. A comparing means is arranged in the vehicle and stores a plurality of verification codes associated with the identification codes. The comparing means retrieves the identification code of one of the electronic keys and compares the retrieved identification code with an associated one of the verification codes. A control means for restricting activation of the terminal to prevent the private information from being accessed by a third person when the retrieved identification code is the restriction code.

A further aspect of the present invention is a method for controlling operation of a vehicle having information processing systems, and restricting access to private information stored in the information processing systems. The method includes providing a plurality of keys for operating the vehicle, with each key storing an identification code and at least one of the identification codes being different than any of the other identification codes. The method further includes storing verification codes in the vehicle corresponding to the identification codes, transmitting the identification code from one of the keys to the vehicle, and determining if the identification code received from the key corresponds to any of the verification codes. If the identification code received corresponds to a verification code, access to private information stored in information processing systems in the vehicle is allowed in accordance with predetermined restriction information associated with the corresponding verification code. If the identification code received does not correspond to any of the verification codes, operation of the vehicle is prevented.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
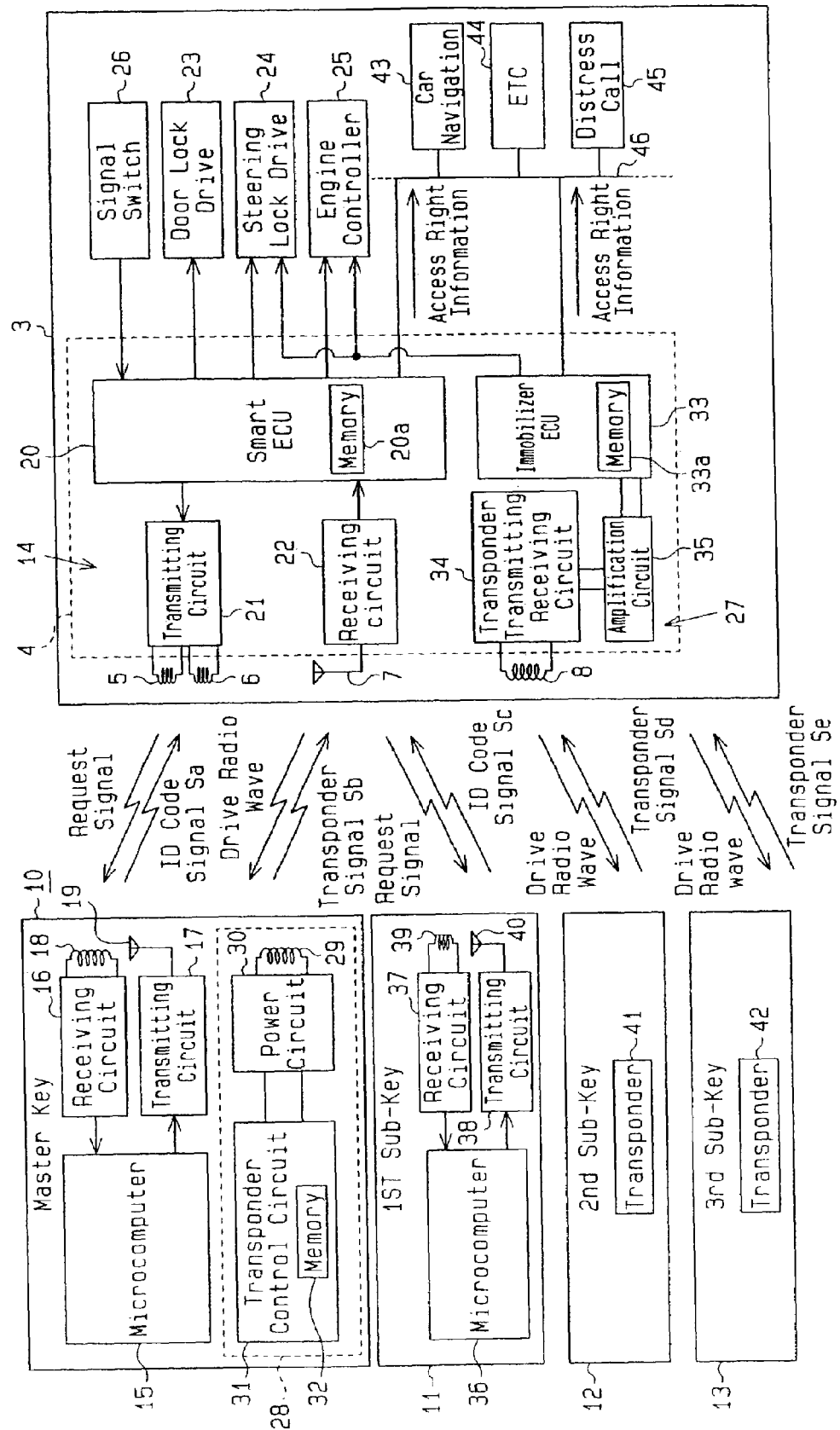
FIG. 1 is schematic block diagram illustrating an electronic key system according to a preferred embodiment of the present invention.

In the drawings, like numerals are used for like elements throughout.

Figure 2:
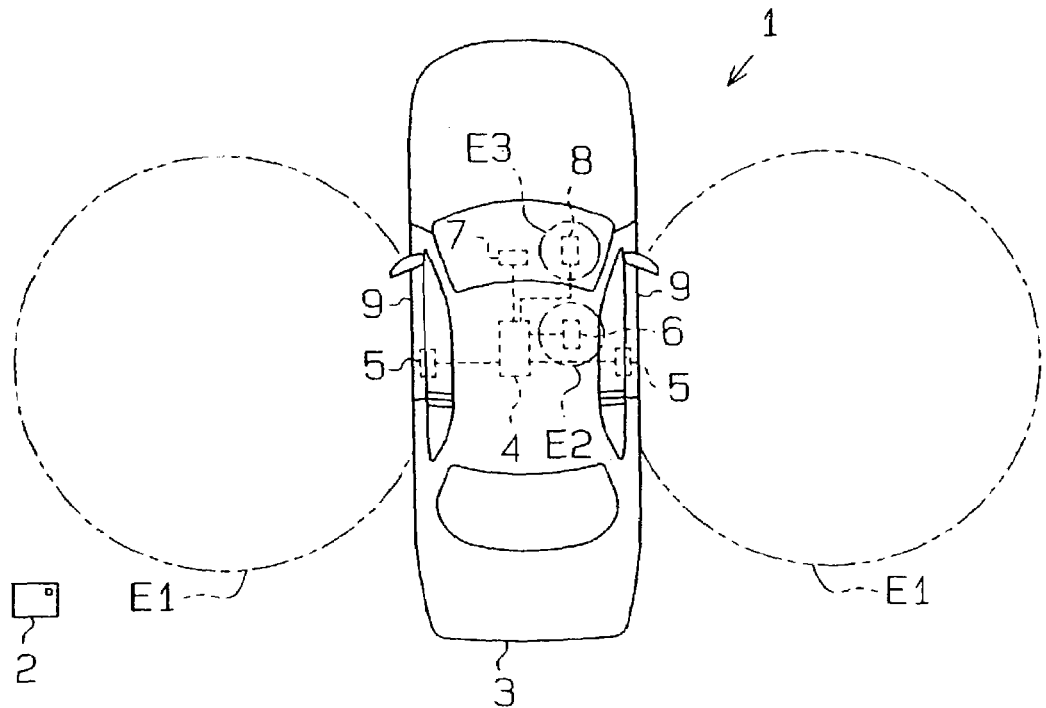
FIG. 2 is a diagram schematically illustrating the electronic key system of FIG. 1.

FIG. 2 is a diagram schematically illustrating an electronic key system 1 according to a preferred embodiment of the present invention. The electronic key system 1, which is a wireless system for performing predetermined key operations, and includes an electronic key 2, which can be carried by a person, and a controller 4, which is installed in a vehicle 3. Wireless communication is performed between the electronic key 2 and the controller 4. The controller 4 and the electronic key 2 transfer various types of signals (radio transmissions) between each other via a plurality of antennas, which are installed in the vehicle.

The antennas includes coil antennas 5, which are installed in left and right doors 9, a coil antenna installed in the driver's seat, a receiving antenna 7, and an immobilizer coil antenna 8. Wireless communication with the electronic key 2 is enabled within range E1 by the antenna 5, range E2 by the antenna 6, and range E3 by the antenna 8. The antennas 5 to 8 are connected to the controller 4 by signal wires (communication cables).

Figure 3:
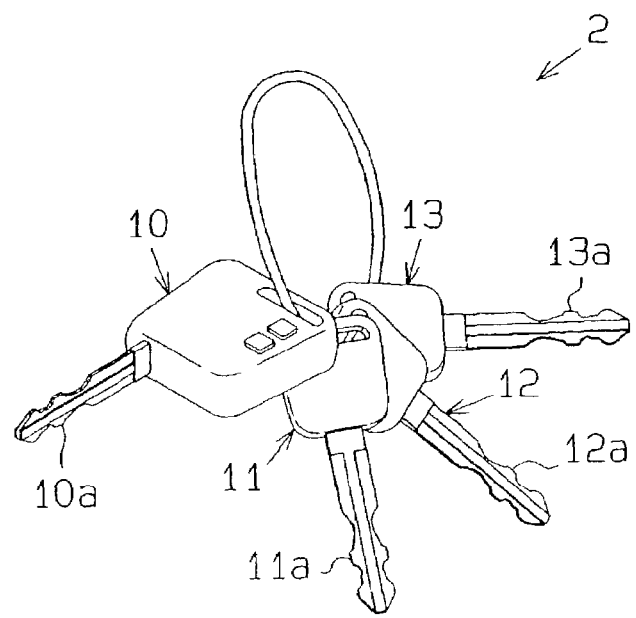
FIG. 3 is a perspective view showing the electronic key.

FIG. 3 is a perspective view showing the electronic key 2. The electronic key 2 includes a master key 10 and a plurality of (three in the preferred embodiment) sub-keys 11, 12, and 13. The master key 10 is the key that is always held by the owner (driver) of the vehicle 3. The sub-keys 11 to 13 are the keys that may be lent to a third person. The keys 10 to 13 respectively have key plates 10*a* to 13*a* with predetermined key grooves. The key plates 10*a* to 13*a* are inserted in a door lock cylinder or an engine starting cylinder (neither shown) and turned to lock or unlock the door 9 or to mechanically start the engine.

FIG. 1 is schematic block diagram illustrating the electronic key system. The electronic key system 1 includes a smart key system 14. The smart key system 14 automatically unlocks the doors 9 when the owner, who is holding the master key 10 approaches the door 9 of the vehicle 3 and automatically locks the doors 9 when the owner moves away from the vehicle 3. Accordingly, the smart key system 14 has a keyless entry function. The smart key system 14 also has an ignition function that starts the engine by turning an ignition knob (not shown) even if the master key 10 is not inserted in the engine starting cylinder.

The master key 10 incorporates a microcomputer 15, a receiving circuit 16, and a transmitting circuit 17. The receiving circuit 16 receives a request signal (radio transmission) sent from the vehicle 3 via an antenna 18 and provides the microcomputer 15 with the request signal. When receiving the request signal, the microcomputer 15 generates an identification (ID) code signal, which corresponds to an ID code of the master key 10 (hereinafter referred to as master ID code), and provides the transmitting circuit 17 with the ID code signal. The transmitting circuit 17 modulates the ID code signal to generate a modulated ID code signal (radio transmission) Sa. The ID code signal Sa is sent to the controller 4 via an antenna 19.

The controller 4 includes a smart electronic control unit (ECU) 20, which serves as a comparing means and a control means, a transmitting circuit 21, and a receiving circuit 22. The transmitting circuit 21 cause a request signal, which is provided from the smart ECU 20, to be included in a radio transmission having a predetermined frequency and transmits the request signal to an external device via the antennas 5 or 6. The receiving circuit 22 receives the ID code signal Sa via the antenna 7, converts the ID code signal Sa to a pulse signal, and provides the pulse signal to the smart ECU 20.

The smart ECU 20 includes a central processing unit (not shown) and a memory 20*a*, which stores a plurality of ID codes (hereinafter referred to as smart ID codes; verification codes). Each smart ID code corresponds to one of the master and sub-keys 10 to 13. Further, in accordance with the ID code signal Sa, the smart ECU 20 activates a door lock drive device 23, a steering lock drive device 24, and an engine controller 25, which are installed in the vehicle 3.

A signal switch 26 is connected to the smart ECU 20 to perform switching between the antennas 5 and 6 of the transmitting circuit 21. The signal switch 26 provides the smart ECU 20 with an OFF signal before the driver enters the vehicle 3 and an ON signal when the driver gets into the vehicle 3 and closes the door 9. When receiving the OFF signal from the signal switch 26, the smart ECU 20 transmits a request signal from the antenna 5. When receiving the ON signal from the signal switch 26, the smart ECU 20 transmits a request signal from the antenna 6.

The smart key system 14 functions as described below. First, when the door 9 is locked, the signal switch 26 generates the OFF signal. The smart ECU 20 intermittently transmits the request signal from the antenna 5 in accordance with the OFF signal. When the driver holding the master key 10 enters range E1 (refer to FIG. 2), the master key 10 receives the request signal via the antenna 18 and activates the microcomputer 15 to transmit the ID code signal Sa from the antenna 19. In other words, the master key 10 is normally in a standby mode and automatically returns the ID code signal Sa when receiving the request signal.

The smart ECU 20 receives the ID code signal (master ID code) Sa via the antenna 7 and the receiving circuit 22 and compares the master ID code with the smart ID code. When the master ID code matches the smart ID code and the OFF signal is received from the signal switch 26, the smart ECU 20 activates the door lock drive device 23 and unlocks the doors 9. If the two ID codes do not match, the smart ECU 20 leaves the doors 9 in a locked state. Accordingly, the smart entry key function automatically unlocks the doors 9 without operating a key.

Then, when the driver is seated on the driver's seat and closes the door 9, the signal switch 26 generates the ON signal. In accordance with the ON signal, the smart ECU 20 intermittently transmits the request signal from the antenna 6 instead of the antenna 5. The master key 10 receives the request signal from the antenna 18 in range E2 (refer to FIG. 2) and activates the microcomputer 15 to transmit the ID code Sa from the antenna 18. The smart ECU 20 receives the ID code signal Sa and compares the master ID code with the smart ID code.

When the master ID code matches the smart ID code and the ON signal is received from the signal switch 26, the smart ECU 20 enables starting of the engine. That is, the smart ECU 20 drives the steering lock drive device 24 to unlock the steering lock (not shown) and provides the engine controller 25 with an engine starting permission signal. When the ignition knob is turned, the engine controller 25 performs fuel injection and engine ignition in accordance with the engine start permission signal to start the engine. Thus, the driver holding the master key 10 starts the engine with the ignition function just by turning the ignition knob (not shown).

When the two ID codes do not match, the smart ECU 20 activates its immobilizer function and prohibits engine starting. That is, the smart ECU 20 does not provide the engine controller 25 with the engine start permission signal so that fuel injection (or engine ignition) is not performed even when the ignition knob is turned to disable the starting of the engine. Thus, since the ignition function is not activated unless the master ID code matches the smart ID code, a third person who does not have the master key 10 cannot start the engine without consent.

A battery (not shown) drives the microcomputer 15 of the master key 10. Just in case the battery goes dead, the electronic key system 1 employs the immobilizer system 27. The master key 10 includes a transponder 28, which is configured by a single IC chip. The transponder 28 includes a coil antenna 29, a power circuit 30, and a transponder control circuit 31.

In range E3 (refer to FIG. 2), the antenna 29 receives a drive radio transmission (electromagnetic energy) from the vehicle 3. The power circuit 30 generates power with the drive radio transmission and supplies the transponder control circuit 31 with power. The transponder control circuit 31 includes a memory 32. The memory 32 stores a transponder ID code. The transponder control circuit 31 uses the power circuit 30 as a power supply and generates a transponder signal in accordance with the transponder ID code. The transponder control circuit 31 converts the transponder signal to a radio transmission having a predetermined frequency to generate a transponder signal (radio transmission) Sb and transmits the transponder signal Sb to an external device via the antenna 29.

The controller 4 includes an immobilizer ECU 33, which functions as a comparing means and a control means, a transponder transmitting/receiving circuit 34, and an amplification circuit 35. The transponder transmitting/receiving circuit 34 receives the transponder signal Sb from an external device via the antenna 8 and converts the transponder signal Sb to a pulse signal. The amplification circuit 35 amplifies the amplification circuit 35 and provides the amplified pulse signal to the immobilizer ECU 33.

The immobilizer ECU 33 includes a central processing unit (not shown) and a memory 33a, which stores a plurality of ID codes (hereinafter referred to as immobilizer ID codes; verification codes). When receiving the transponder signal (transponder ID code) Sb via the antenna 8, the immobilizer ECU 33 compares the transponder ID code with the immobilizer ID code. When the two ID codes match, the immobilizer ECU 33 generates an encrypted engine start permission signal and provides the engine controller 25 with the encrypted engine start permission signal.

When the battery of the master key 10 goes dead, the immobilizer system 27 functions in the following manner. When the driver is seated on the driver's seat, the driver inserts the key plate 10a of the master key 10 into the engine starting cylinder. In this state, the master key 10 is located within range E3 (refer to FIG. 2). Thus, the transponder 28 receives the intermittently transmitted radio transmissions via the antenna 29 and generates power from the radio transmissions to activate the transponder control circuit 31. The transponder control circuit 31 then transmits the transponder signal Sb from the antenna 29.

The immobilizer ECU 33 receives the transponder ID code via the antenna 8, the transponder transmitting/receiving circuit 34, and the amplification circuit 35 and compares the transponder ID code with the immobilizer ID code. When the two ID codes do not match, the immobilizer ECU 33 does not provide the engine controller 25 with the engine start permission signal. Thus, the engine controller 25 stops engine ignition or forcibly cuts fuel injection even when the ignition knob or key is operated to prevent the engine from being started. Accordingly, this effectively prevents the vehicle from being stolen.

When the two ID codes match, the immobilizer ECU 33 permits engine starting and provides the engine controller 25 with the engine start permission signal. Whenever the ignition knob or key is operated, the engine controller 25 performs engine ignition to start the engine in accordance with the engine start permission signal. When the master key 10 is inserted in the engine starting cylinder, which is located beside the steering wheel, the steering lock drive device 24 is unlocked if the key groove of the master key 10 is aligned with that of the cylinder.

The first sub-key 11 may be used to activate the smart key system 14. The first sub-key 11 includes a microcomputer 36, a receiving circuit 37, and a transmitting circuit 38. The transmitting circuit 38 transmits the ID code signal Sc, which includes a first sub-ID code (restriction code) of the first sub-key 11, to an external device.

The second and third sub-keys 12 and 13 may be used to start the engine. The second sub-key 12 includes a transponder 41. The transponder 41 generates a transponder signal Sd, which includes a second sub-ID code (restriction code) of the second sub-key 12, and transmits the transponder signal Sd to an external device. The third sub-key 13 includes a transponder 42. The transponder 42 generates a transponder signal Se, which includes a third sub-ID code (restriction code) of the third sub-key 13, and transmits the transponder signal Se to an external device.

A plurality of terminals, such as a car navigation system terminal 43, an ETC terminal 44, and a distress call system terminal 45, are installed in the vehicle 3. The terminals 43 to 45 are connected to the smart ECU 20 and the immobilizer ECU 33 via a vehicle LAN 46.

When an ID code received from an external device is compared with an ID code stored in the memory 20a, the smart ECU 20 generates access right information and provides the terminals 43 to 45 with the access right information via the LAN 46. In the preferred embodiment, the smart ECU 20 generates access right information X, which permits usage of all of the terminals 43 to 45, when receiving the master ID code from the master key 10. The smart ECU 20 generates access right information Y, which prohibits usage of all of the terminals 43 to 45, when receiving the first sub-ID code from the first sub-key 11.

When comparing the transponder ID code with the immobilizer ID code, the immobilizer ECU 33 generates access right information and provides the access right information to the terminals 43 to 45 via the LAN 46. In the preferred embodiment, the immobilizer ECU 33 generates the access right information Y, which prohibits usage of all of the terminals 43 to 45 when receiving the second sub-ID code from the second sub-key 12. Further, the immobilizer ECU 33 generates the access right information Z, which permits usage of only the car navigation system terminal 43 when receiving the third sub-ID code from the third sub-key 13.

The usage of the terminals 43 to 45 is enabled when the access right information X is received. Further, the usage of the terminals 43 to 45 is disabled when the access right information Y is received. A disabled state refers, for example, to a state in which the terminals 43 to 45 are not supplied with power, a state in which the terminals 43 to 45 are not activated even if their power buttons are pushed, and a state in which only an initial screen (e.g., standby screen) is continuously shown on a display of the terminals and other screens do not appear on the display. When the access right information Z is received, only the car navigation system terminal 43 is activated and the usage of the ETC terminal 44 and the distress call system terminal 45 is prohibited.

The generation of the access right information by the smart ECU 20 and the immobilizer ECU 33 will now be discussed. When performing key operations with the master key 10, if the driver who is holding the master key 10 enters range E1 (refer to FIG. 2), the smart ECU 20 receives the master ID code from the master key 10 and unlocks the door. Further, the smart ECU 20 provides the LAN 54 with the access right information X. In this state, the access right information X enables the terminals 43 to 45 to be activated and used normally. Accordingly, the master key 10 enables usage of all of the terminals 43 to 45.

When performing key operations with the first sub-key 11, if the driver who is holding the first sub-key 11 enters range E1 (refer to FIG. 2), the smart ECU 20 receives the first sub-ID code from the first sub-key 11 and unlocks the door.

Further, the smart ECU 20 provides the LAN 54 with the access right information Y. In this state, the access right information Y prohibits the usage of the terminals 43 to 45. Accordingly, when lending the first sub-key 11 and the vehicle 3 to a third person, the third person is permitted to use the smart key system 14 but cannot use the terminals 43 to 45.

When performing key operations with the second sub-key 12, if the second sub-key 12 is inserted in an engine starting cylinder, the immobilizer ECU 33 receives the second sub-ID code from the second sub-key 12, permits the starting of the engine, and provides the LAN 54 with the access right information Y. In this state, the access right information Y prohibits the usage of the terminals 43 to 45. Accordingly, when lending the second sub-key 12 and the vehicle 3 to a third person, the third person is permitted to start the engine but cannot use the terminals 43 to 45.

When performing key operations with the third sub-key 13, if the third sub-key 13 is inserted in an engine starting cylinder, the immobilizer ECU 33 receives the third sub-ID code from the third sub-key 13, permits starting of the engine, and provides the LAN 54 with the access right information Z. In this state, the access right information Z enables the usage of the car navigation system terminal 43 and disables the usage of the ETC terminal 44 and the distress call system terminal 45. Accordingly, when lending the third sub-key 13 and the vehicle 3 to a third person, the third person is permitted to start the engine and use the car navigation system terminal 43 but cannot use the ETC terminal 44 and the distress call system terminal 45.

The electronic key system 1 has the advantages described below.

(1) When using the first to third sub-keys 11 to 13, the smart ECU 20 or the immobilizer ECU 33 restricts the usage of the terminals 43 to 45 in accordance with the first to third sub-keys 11 to 13. Thus, by lending one of the first to third sub-keys 11 to 13 with the vehicle 3 to a third person, the terminals 43 to 45 cannot be used without consent. Accordingly, the key may be lent to a third person without any worries.

(2) When using the third sub-key 13, only the car navigation system terminal 43 is activated and the ETC terminal 44 and the distress call system terminal 45 are not activated. Thus, by lending the sub-key 13, the usage of only the car navigation system terminal 43 is permitted. Accordingly, in the electronic key system 1, the sub-key may be used to drive the vehicle 3 and activate only predetermined ones of the terminals 43 to 45.

(3) The first to third sub-keys 11 to 13 restrict the activation of the terminals 43 to 45. Thus, when lending the first to third sub-keys 11 to 13 to a third person, the third person cannot activate the terminals 43 to 45.

(4) The first to third sub-keys 11 to 13 restrict the usage of the ETC terminal 44. Thus, by lending one of the first to third sub-keys 11 to 13 to a third person, the ETC terminal 44 cannot be used to pay tolls for toll roads.

It should be apparent to those skilled in the art that the present invention may be embodied in many other specific forms without departing from the spirit or scope of the invention. Particularly, it should be understood that the present invention may be embodied in the following forms.

The terminals of which usage is restricted by the first to third sub-keys 11 to 13 may be altered as required. For example, the first sub-key 11 may restrict only the usage of the car navigation system terminal 43, the second sub-key 12 may restrict the usage of the car navigation system terminal 43 and the ETC terminals 44, and the third sub-key 13 may restrict the usage of the ETC terminal 44 and the distress call system 45.

The key operation functions of the first to third sub-keys 11 to 13 may be provided through only one of the smart key system 14 and the immobilizer system 27. For example, the first sub-key 11 may transmit the transponder signal to activate the immobilizer system 27. Further, the second sub-key 12 and the third sub-key 13 may transmit ID code signals to activate the smart key system 14.

The number of sub-keys is not limited to three and may be any number, such as one, two, or four.

The master key 10 may be separated into a portable device, which activates the smart key system 14, and an ignition key, which incorporates the transponder 28 and activates the immobilizer system 27.

The vehicle terminal may be, for example, a terminal of a system for downloading music through the Internet, or a terminal of a system for automatically paying for purchased items.

The method for restricting the usage of the terminals 43 to 45 with the first to third sub-keys 11 to 13 is not restricted as long as the usage of the terminals may be disabled.

The steering lock may be manually unlocked when the key plate of the electronic key 2 is inserted into the engine starting cylinder and turned as the key groove of the key plate becomes aligned with the groove of the cylinder.

Any type of electronic key may be used as long as it can transmit an ID code. For example, the electronic key may be an ID transmission device or a cellular phone.

The electronic key may transmit an ID code to the vehicle through, for example, the human body. In such a case, a driver who is holding an electronic key in which an ID code is stored touches the door of the vehicle to transmit the ID code to the vehicle 3 through the driver's body.

The vehicle may be a two wheel vehicle or an industrial vehicle.

The present examples and embodiments are to be considered as illustrative and not restrictive, and the invention is not to be limited to the details given herein, but may be modified within the scope and equivalence of the appended claims.

What is claimed is:

1. An electronic key system for use in a vehicle comprising:
a terminal installed in the vehicle to process predetermined information;
a plurality of electronic keys, each storing an identification code and transmitting the identification code to the vehicle, wherein the electronic keys include a master key and a sub-key, and wherein the identification codes include a master identification code stored in the master key and a sub-identification code stored in the sub-key;
a comparing means arranged in the vehicle and storing a plurality of verification codes associated with the identification codes, wherein the comparing means retrieves the identification code of one of the electronic keys and compares the retrieved identification code with an associated one of the verification codes; and
a control means for generating access right information that restricts activation of the terminal when the retrieved identification code is the sub-identification code and providing the terminal with the access right information, wherein the control means enables starting of an engine of the vehicle or unlocking doors of the vehicle when the retrieved identification code matches with the associated one of the verification codes;
wherein the terminal is one of a plurality of terminals, and the control means generates the access right information that corresponds to the sub-identification code and selectively restricts the usage of each terminal in accordance with the sub-identification code when the sub-identification code matches with the associated one of the verification codes and starting of an engine or unlocking doors of the vehicle is enabled, and wherein the control means generates the access right information that corresponds to the master identification code and permits the usage of all of the plurality of terminals when the master identification code matches with the associated one of the verification codes and starting of an engine of the vehicle or unlocking doors of the vehicle is enabled, and wherein when each of the plurality of terminals receives the access right information generated from the sub-identification code from the control means, each terminal interprets the access right information generated from the sub-identification code to determine operation of a terminal that is to be restricted and that differs from that of other terminals in accordance with the access right information.

2. The key system according to claim 1, wherein the control means generates the access right information that disables usage of the terminal when the retrieved identification code is the sub-identification code.

3. The key system according to claim 1, wherein the terminal includes a power control used to activate the terminal, and the control means generates the access right information that prohibits activation of the terminal when the identification code is the sub-identification code even if the power control is operated to activate the terminal.

4. The key system according to claim 1, further comprising:
a transmitting/receiving circuit connected to the comparing means to supply the master key with power through a radio transmission and receive the master identification code from the master key, wherein the master key converts the radio transmission to power and uses the power to transmit the master identification code to the transmitting/receiving circuit.

5. The key system according to claim 1, wherein the control means generates the access right information that disables usage of a predetermined terminal in accordance with the sub-identification code.

6. The key system according to claim 1, wherein the plurality of terminals includes a car navigation system terminal, an electronic toll collection terminal, and/or a distress call system.

7. An electronic key system for use in a vehicle comprising:
a terminal installed in the vehicle to store information including private information;
a plurality of electronic keys, each storing an identification code and transmitting the identification code to the vehicle, wherein the electronic keys include a master key and a sub-key, and wherein the identification codes include a master identification code stored in the master key and a sub-identification code stored in the sub-key;
a comparing means arranged in the vehicle and storing a plurality of verification codes associated with the identification codes, wherein the comparing means retrieves the identification code of one of the electronic keys and compares the retrieved identification code with an associated one of the verification codes; and
a control means for generating access right information that restricts activation of the terminal to prevent the private information from being accessed by a third person when the retrieved identification code is the sub-identification code and providing the terminal with the access right information, wherein the control means enables starting of an engine of the vehicle or unlocking doors of the vehicle when the retrieved identification code matches with the associated one of the verification codes;

wherein the terminal is one of a plurality of terminals, and the control means generates the access right information that corresponds to the sub-identification code and selectively restricts the usage of each terminal in accordance with the sub-identification code when the sub-identification code matches with the associated one of the verification codes and starting of an engine or unlocking doors of the vehicle is enabled, and wherein the control means generates the access right information that corresponds to the master identification code and permits the usage of all of the plurality of terminals when the master identification code matches with the associated one of the verification codes and starting of an engine of the vehicle or unlocking doors of the vehicle is enabled, and wherein when each of the plurality of terminals receives the access right information generated from the sub-identification code from the control means, each terminal interprets the access right information generated from the sub-identification code to determine operation of a terminal that is to be restricted and that differs from that of other terminals in accordance with the access right information.

8. The key system according to claim 7, wherein the control means generates the access right information that disables usage of the terminal when the retrieved identification code is the sub-identification code.

9. The key system according to claim 7, wherein the control means stops supplying the terminal with power when the identification code is the sub-identification code.

10. An electronic key system for use in a vehicle comprising:
a terminal installed in the vehicle to store information including private information, the terminal comprising one of a plurality of terminals;
a plurality of electronic keys, each storing an identification code and transmitting the identification code to the vehicle, wherein the electronic keys include a master key and a sub-key, and wherein the identification codes include a master identification code stored in the master key and a sub-identification code stored in the sub-key; and
a control means arranged in the vehicle to retrieve one of the identification codes and compare the retrieved identification code with an associated one of the verification codes, wherein the control means generates access right information that corresponds to the sub-identification code and restricts operation of the terminal to prevent the private information from being accessed by a third person when the sub-identification code matches with the associated one of the verification codes and starting of an engine or unlocking doors of the vehicle is enabled, and wherein the control means generates the access right information that corresponds to the master identification code and permits the usage of all of the plurality of terminals when the master identification code matches with the associated one of the verification codes and starting of an engine of the vehicle or unlocking doors of the vehicle is enabled wherein when each of the plurality of terminals receives the access right information generated from the sub-identification code from the control means, each terminal interprets the access right information generated from the sub-identification code to determine operation of a terminal that is to be restricted and that differs from that of other terminals in accordance with the access right information.

11. A method for controlling operation of a vehicle having a terminal, and restricting access to private information stored in the terminal, the method comprising:
   (a) providing a plurality of keys for operating the vehicle, with each key storing an identification code wherein the keys include a master key and a sub-key, and wherein the identification codes include a master identification code stored in the master key and a sub-identification code stored in the sub-key;
   (b) storing verification codes in the vehicle corresponding to the identification codes;
   (c) transmitting the identification code from one of the keys to the vehicle;
   (d) determining if the identification code received from the key corresponds to any of the verification codes;
   (e) if the received identification code matches with the any one of the verification codes, enabling starting of an engine of the vehicle or unlocking doors of the vehicle;
   (f) if the identification code received corresponds to a verification code and is the sub-identification code and starting an engine of the vehicle is enabled, generating access right information, corresponding to the sub-identification code, for restricting operation of the terminal to prevent access to private information stored in the terminal in the vehicle in accordance with the sub-identification code;
   (g) if the identification code received corresponds to a verification code and is the master identification code and starting of an engine of the vehicle or unlocking doors of the vehicle is enabled, generating access right information, corresponding to the master identification code, for permitting access to private information stored in the terminal in the vehicle;
   (h) providing the terminal with the access right information; and
   (i) if the identification code received does not correspond to any of the verification codes, preventing operation of the vehicle;
   wherein the terminal comprises one of a plurality of terminals; and
   (j) when each of the plurality of terminals receives the access right information generated from the sub-identification code, each terminal interprets the access right information generated from the sub-identification code to determine operation of a terminal that is to be restricted and that is different from that of other terminals in accordance with the access right information.

12. The method according to claim 11, wherein each key includes a transmitter, and said transmitting is performed using the transmitter in said one of the keys.

13. The method according to claim 12, wherein said determining is performed using an electronic control unit having a receiving circuit for receiving transmissions from the keys and providing corresponding information to the electronic control unit.

14. The method according to claim 11, wherein said generating access right information includes generating access right information for unrestricted access to private information when the received identification code is the master identification code.

15. The method according to claim 11, wherein the access right information associated with the sub-identification code is to disable usage of said terminal.

16. The method according to claim 15, wherein usage of said terminal is disabled by preventing power from being supplied to the terminal.

* * * * *